Nov. 4, 1958    H. L. SAXTON ET AL    2,859,433
OWN DOPPLER NULLIFIER
Filed Dec. 29, 1950    2 Sheets-Sheet 1
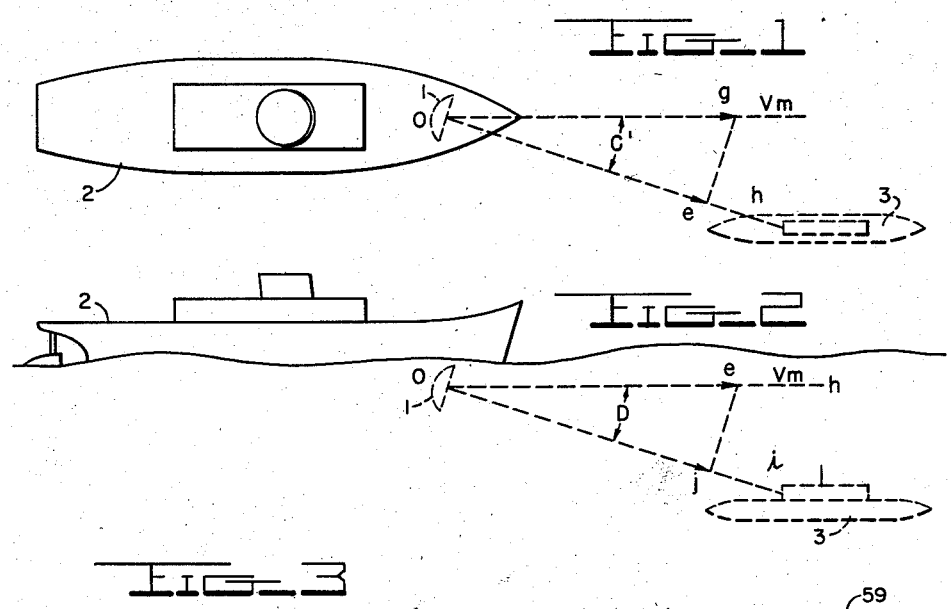
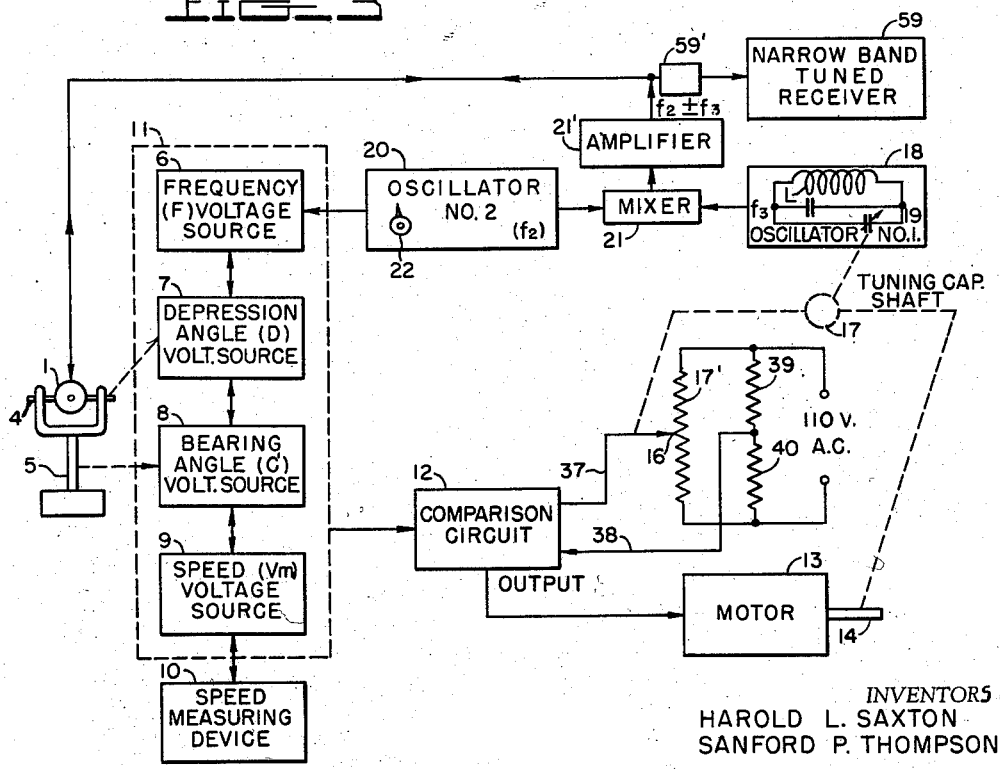
INVENTORS
HAROLD L. SAXTON
SANFORD P. THOMPSON
BY
ATTORNEYS

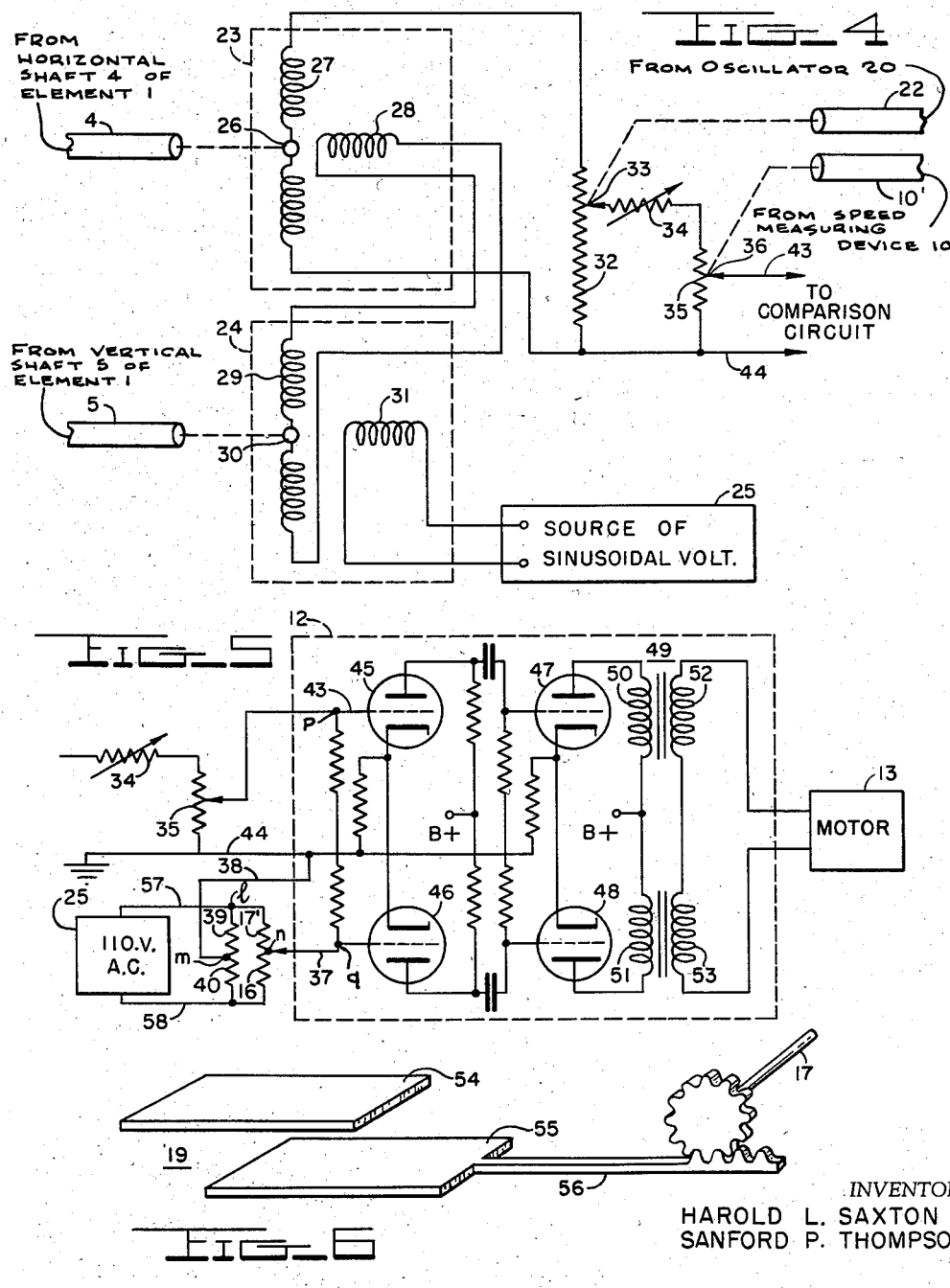

United States Patent Office 2,859,433
Patented Nov. 4, 1958

2,859,433

OWN DOPPLER NULLIFIER

Harold L. Saxton and Sanford P. Thompson,
Washington, D. C.

Application December 29, 1950, Serial No. 203,462

4 Claims. (Cl. 343—8)

(Granted under Title 35, U. S. Code (1952), sec. 266)

This invention relates to a method and apparatus for use in radio and sound echo-detection devices for nullifying the Doppler effect due to the motion of the transmitter.

More particularly, this invention relates to a method and apparatus for use in radio and sound echo detecting devices for nullifying the difference between the transmitted frequency and the echo frequency due to the motion of the transmitter relative to an assumed stationary target, and thereby enabling a receiver to be more narrowly tuned with resulting improvement in signal to noise ratio.

In echo ranging apparatus such as radar and sonar devices, the signal to noise ratio is of utmost importance in determining the useful range of the apparatus. To this end, the bandwidth of the receiver is made as narrow as practically feasible to lessen the noise level in the output of the receiver.

Where there is relative motion between a transmitter and a target, the echo frequency is different from that transmitter frequency due to what is commonly known as doppler effect. When a receiver is tuned to the echo frequency at a given time, and either the relative speed or direction between the target and transmitter is changed, the echo frequency will also change due to Doppler effect, and the receiver will then be off frequency. This results in a decrease in receiver output which will of course decrease the operating range of the receiver. Broader tuned circuits would aid the situation perhaps, but doing so would only increase the noise level of the receiver.

Retuning the receiver is another possible solution, but this is obviously impractical where the error due to Doppler frequenciy is continually changing.

One object of the present invention is therefore to provide a method and apparatus for increasing the signal to noise ratio of a receiver used with an echo detecting system by nullifying the shift in echo frequency due to the relative motion between target and transmitter.

Another object of the present invention is to provide a method and apparatus for use in echo detecting systems for nullifying the shift in echo frequency due to relative motion between the transmitter and an assumed stationary target.

A further object of the present invention is to provide a method and apparatus for nullifying the apparent change in transmitter frequency due to Doppler effect where the relative motion between the transmitter and an object against which the transmitter wave is going to strike is known.

These and further objects will become apparent when reference is made to the annexed specification and the attached drawings wherein:

Fig. 1 includes various reference lines, velocity vectors, and angles in a horizontal plane used to determine the Doppler error due to the relative motion between a moving boat on which a sound propagating element is mounted and a submarine.

Fig. 2 shows various reference lines, velocity vectors, and angles in a vertical plane used to determine the Doppler error due to the relative motion between a moving boat on which a sound propagating element is mounted, and a submarine.

Fig. 3 is a block diagram of the system forming the present invention.

Fig. 4 is a schematic diagram of the computer circuit.

Fig. 5 is a schematic diagram of one embodiment of a comparison circuit which can be used with the present invention.

Fig. 6 shows one way to vary the capacity of the oscillator circuit.

Basically the present invention encompasses the method of, and apparatus for, varying the frequency of the propagated sound or electromagnetic wave in a direction opposite to the change of frequency due to the Doppler error and in amount so that the echo or received frequency from an assumed stationary target will be the same irrespective of the speed or motion of the propagating apparatus.

In the descriptive matter to follow the considerations for determining the frequency shift due to the Doppler effect will first be discussed, followed by the description of the apparatus for nullifying the Doppler effect.

Referring now to Figures 1 and 2, a sound propagating element 1 is immersed in water and is shown rigidly extending from a ship 2. If ship 2, and hence the propagating element 1, is moving straight ahead at a velocity $Vm$, the apparent frequency of the echo sound waves received at boat 2 which have been reflected from an assumed stationary target 3 located to the right of propagating element 1 at an angle $C'$ (measured in a horizontal plane) and below same at angle $D$ (measured in a vertical plane) may be shown to be given by the following formula.

(1)
$$f_r = \frac{C + Vm \cos C' \cos D}{C - Vm \cos C' \cos D} \cdot f_1$$

$$= \frac{1 + \dfrac{Vm}{C} \cos C' \cos D}{1 - \dfrac{Vm}{C} \cos C' \cos D} \cdot f_1$$

where
$f_r$=received frequency
$C$=velocity of sound in sea water=7800 ft./sec.
$f_1$=frequency propagated by sound emitting element 1
If $Vm \ll C$ (which is generally the case) then $$f_r = 1 + \frac{2Vm}{C} \cos C' \cos D \cdot f_1$$

(2)

The Doppler frequency $fd = f_1 - f_r = \dfrac{2Vm}{C} \cos C' \cos D \cdot f_1$ In order to show how this Doppler effect is nullified, assume that a submarine is stationary and directly in line with the path of motion of ship 2 ($\cos C' = 1$) and that it is near the surface of the water ($\cos D = 1$). If the boat was going 30 knots toward the submarine and the propagated frequency was 30 kc., then the echo frequency would be 30 kc.+.64 kc. according to Formula 2 (i. e. the Doppler frequency is about 636 cycles). The receiver which was adjusted to 30 kc. when the boat was stationary is now out of tune by 636 cycles. This may not seem like much of a Doppler effect at first glance, but it is appreciable when one considers that the receiver is very narrowly tuned to improve the signal to noise ratio.

This Doppler effect may be nullified by decreasing the frequency of the propagated wave ($f_1$) so that the echo frequency is still 30 kc.

It should be apparent that if the ship 2 were receding rather than approaching the submarine at 30 knots, then the propagated frequency would be increased by about 636 cycles and not decreased by that amount for here the echo frequency without the Doppler nullification would be 30 kc. minus 636 cycles.

If the propagated frequency $f_1$ (30 kc.) is decreased by an amount equal to the Doppler error frequency (636 cycles per second) the echo frequency will not exactly be 30 kc. because the Doppler error at a propagation frequency of 29.364 kc. (30—.636) is not exactly 636 cycles but is sufficiently close to 636 if the Doppler frequency is a very small percentage of the propagated frequency, that the difference is small. An equation may be derived to give the exact decrease in a given propagated frequency needed to exactly correct for Doppler error at said given propagated frequency, given speed of the ship angles C' and D and the speed of sound. To simplify the computing apparatus used with the present invention, and which will be later described in detail, the Doppler error is corrected by varying the frequency by the amount of the Doppler error.

A question may arise as to the utility of the apparatus if the target or submarine were not stationary as previously supposed. Thus assume the target was approaching the ship from dead ahead position and at water level at 30 knots. Then with the ship 2 going 30 knots and without the apparatus for nullifying the Doppler error, the relative velocity between target 3 and ship 2 is now twice what it was before so the Doppler frequency is (2×.636) 1.372 kc. With the Doppler nullifying apparatus of the present invention operating, this Doppler frequency would be cut in half. The result is that the band-width of the tuned inductance-capacitance circuits need only be wide enough to correct for the maximum expected echo frequency shift due to the target's motion.

Fig. 3 is a block diagram of the elements of the system forming the present invention.

Basically, the system for nullifying the Doppler effect comprises the steps of calculating the ship's own Doppler effect by generating voltage proportional to the ship's speed (V$m$), the desired frequency to be received, the propagated frequency before the Doppler effect is corrected, and the cosines of the depression angle D and bearing angle C', and then producing a voltage which is proportional to the product of all of these voltages (i. e. $KVm \cos C' \cos Df_1$=Doppler error). Then this latter voltage is used to vary one of the tuned circuit parameters of the transmitter oscillator to change the propagated frequency in the correct direction and amount. Referring more particularly to Fig. 3, a directive sound propagating means 1 is mounted for rotation about a horizontal axis 4 and a vertical axis 5. The particular details of this propagating means is not important to the present invention, and such means are well known in the art. Propagating means may be used both as a sound propagating and sound detecting means such as is readily possible when magnetostrictive or crystal transducers are used for the propagating means 1.

The frequency propagated is determined by two oscillators 18 and 20 whose sum or difference frequency $f_2 \pm f_3$) obtained from the output of a mixer circuit 21 which is coupled to the oscillators 18 and 20, is equal to the propagated frequency $f_1$. Oscillator 18 is a substantially fixed frequency oscillator while oscillator 20 is varied as the received frequency is to be varied. (The mixer circuit forms no part of the present invention; any one of the many types of mixer circuits commonly known in the art can be used with the present invention.) The output of mixer 21 is fed to any suitable amplifier device 21' which in turn is coupled to propagating element 1. A suitable, conventional decoupling element 59' is coupled to the input of a receiver 59 to prevent the transmitting signals from over-driving the receiver.

Two separate oscillators rather than one oscillator are preferred as this makes possible a system which can more easily nullify the Doppler effect irrespective of the frequency to be propagated or received. This will become more apparent from the explanation later to follow.

Boxes 6, 7, 8, 9, represent four voltage sources operative to produce voltages which are respectively proportional to the propagated frequency ($f_1$) before the Doppler effect is nullified, the cosine of the depression angle D, the cosine of the bearing angle C', and the speed of the propagating or radiating element 1.

The output voltages of voltage sources 6–10 are so interrelated that they form a computer circuit 11, shown in detail in Figure 4 and later to be described, which delivers a voltage proportional to the product of all of these voltages. (NOTE.—As previously explained, this product voltage is a good approximation to the Doppler shift at the new propagation frequency. Although this approximation is preferred because of the simplification of the computer circuit, it should be understood that a more complicated computer circuit could be used to calculate the change in propagated frequency needed to exactly correct for the Doppler shift.)

The output of the computer circuit 11 is fed to a comparison circuit 12 wherein the voltage from a potentiometer 17' which varies with the position of the tuning condenser shaft 17 is compared with the output voltage of the computer 11. If the compared voltages are different, the comparison circuit 12 feeds a voltage to a motor 13 which turns the shaft of a tuning condenser 19 thereby varying the frequency of oscillator 18 and the propagated frequency ($f_2 \pm f_3$). Movable arm 16 of potentiometer 17' is ganged to the condenser shaft so that the condenser 19 is varied until the voltage from potentiometer 17' equals the voltage from the computer 11. The latter voltage remains constant for any setting of oscillator 18 if angles D and C' and ship's speed are constant.

If potentiometer 17' is linearly wound, then the shaft of condenser 19 is rotated through an angle and in a direction proportional to the magnitude and the polarity of the voltage output from the computer 11. Of course, potentiometer 17' could be wound non-linearly if the shape of the condenser plates is changed to compensate, but the problem is appreciably simplified if potentiometer 17' is linearly wound, and the frequency change of oscillator 18 is proportional to the amount of angular variation of the condenser shaft 17.

To see how this latter condition is readily possible consider a condenser whose capacity is linearly related to the amount of rotary motion of a shaft 17. A rotary condenser could be used, or a pair of rectangular interleaving plates (see Fig. 6) whose amount of interleaves is proportional to the amount of rotation of shaft 17.

It can be shown that if the change in capacity of tuning condenser 19 is small relative to the total capacity before any change in the oscillator tuned circuit comprising a conventional parallel resonant circuit, the change in frequency of the tuned circuit and therefore of oscillator 18 will be proportional to the change of capacity of tuning condenser 19. For relatively small changes of capacity the following relation is true for a parallel condenser-inductance tuned circuit having negligible resistance and where the inductance remains constant.

(3) $$\Delta f = \frac{1}{2} \frac{\Delta C}{C} \cdot fr = -K'' \frac{\Delta C}{C} \cdot fr$$

where $\Delta f$=the change in resonant frequency of a tuned circuit
$fr$=resonant frequency before the capacity was changed
$C$=total capacity before it is changed by an amount $\Delta c$
$k''$=.5

Thus, from Equation 3 it can be seen that when the change of capacity is small and when $fr$ and the inductance L are constant, the change in frequency of oscillator 18 is directly proportional to the change of the value of capacity 19 assuming that the frequency of oscillation of oscillator 18 is determined by the tuned circuit in question.

Equation 3 also indicates why it is preferable to beat 2 oscillators to produce the propagated frequency. If only oscillator 18 was utilized as the transmitter oscillator, and one desired to change from an operating frequency of 30 kc. to 40 kc. then either the inductance L, or capacitance C of the tuned circuit of oscillator 18 would be varied. If this were done, as by varying the value of condenser 19 an appreciable amount then, according to Equation 3, a given change in capacity ($\Delta c$) would not produce the same change in oscillator frequency as before. Since the amount of capacity change ($\Delta c$) is only a function of the computer voltage which is dependent only on the Doppler frequency, it is apparent that the system will not properly correct for Doppler shift any more. Thus in order to make the system as simple and effective as possible, it is preferable that two oscillators should be used to produce the frequency of transmission so that the inductance L, and capacitance C of oscillator 18 can be kept substantially constant irrespective of the echo frequency to be received and at the same time allowing appreciable change of the operating frequency $f_1$. The change in operating frequency is thus obtained by varying the frequency of the other oscillator 20.

The specific circuit interconnections of the voltage sources to form the computer circuit are shown in Fig. 4 to which reference is now made.

The depression angle and bearing angle voltage sources each comprise a suitable transformer 23—24 which has a stationary winding (windings 28 and 31 respectively) and a rotatable winding (windings 27 and 29 respectively) which give output voltages varying in magnitude as the cosine of the angle of rotation of the rotary winding. A sinusoidal voltage source 25 is the source of excitation for these transformers. The shafts 26 and 30 of each rotatable winding are coupled respectively to the horizontal and vertical shafts 4 and 5 of the propagating eleemnt 1. The motions of shafts 4 and 5 can be coupled to the rotary transformer shafts by any convenient means as for example a synchro or selsyn system. In such case, shafts 4 and 5 would each be connected to the shaft of a selsyn transmitter and shafts 26 and 30 would each be connected to the shafts of a respective selsyn receiver. These devices are so well known in the art, that their detail circuitry is not shown here.

The output of sinusoidal voltage source 25 is fed to the stationary winding 31 of one of the rotary transformers 24 which in Figure 4 is the bearing angle rotary transformer. The magnitude of output voltage across the rotary winding 29 is therefore proportional to the cosine of the bearing angle of antenna 1 if the shaft 30 of rotary transformer 24 was initially adjusted to give maximum output voltage for zero bearing angle.

The output of the bearing angle transformer 24 is fed to the stationary winding of depression angle transformer 23 so that the output voltage across the rotary winding 27 is proportional to the product of the cosines of the bearing and depression angles, cos C' and cos D.

The shaft of the tuning condenser of oscillator 20 operated by tuning control 22 is geared or otherwise coupled to the movable arm of a potentiometer 32 whose input is coupled to the output of one of the rotary transformers 23 so that when a suitable output of one of the rotary transformers 26 is connected across the potentiometer input, the magnitude of the voltage output of potentiometer 32 is proportional to the frequency $f_1$ which is equal to the frequency propagated without Doppler shift.

The degree of rotation of tuning knob 22 which varies the frequency of oscillator 20 is preferably arranged to be linearly related to this frequency $f_1$. However, if the degree of rotation of shaft 22 is not linearly related to frequency $f_1$, then potentiometer 32 must be so wound that if the input voltage amplitude were constant, then the output voltage would be proportional to the operating frequency $f_1$.

It is not necessary to actually couple the tuning shaft 22 of oscillator 20 to potentiometer 32, but if desired potentiometer 32 may be separately adjustable. In such case a dial would be placed thereon calibrated in units of the desired echo or operating frequency $f_1$.

Speed potentiometer 35 is similar to frequency potentiometer 32 and is coupled to the output of the latter transformer between one end of the potentiometer and the movable contact 33. Potentiometer 35 may be separately adjustable by hand and separately calibrated in units of speed. It would be more convenient here, however, to have the movable arm of the speed potentiometer 35 directly coupled to a speed measuring device 10 since the speed of ship 2 (or whatever vehicle is carrying sound propagating means 1) may be constantly changing. In such an embodiment, the motion of a shaft 10' which is a function of speed of the propagating element, is coupled to the movable arm of speed potentiometer 35. Pitot tubes are common devices for measuring speed of ships and airplanes. The apparatus which is utilized with such a device to give an indication of speed by the degree of rotation of a shaft (for example, the movement of the shaft of a meter device located on the ship's control panel) are obviously old in the art and do not concern the present invention.

Since the output of the depression angle transformer 23 is the input to potentiometer 32 and since the output of the frequency potentiometer 32 is the input to the speed potentiometer 35, the output of the speed potentiometer is proportional to the product of the parameters which determine the ship's own Doppler frequency.

Variable resistance 34 which has been located in the input circuit to the speed potentiometer 35 is for the purpose of adjusting the magnitude of the output voltage of the computer 11 to such a value that the condenser shaft will be tuned the proper amount for at least one Doppler error condition. Resistance 34 is adjusted so that the echo frequency is the same as the propagated frequency if there was no Doppler. Then the apparatus will automatically be properly adjusted for all other conditions (i. e. different Doppler frequency).

For circumstances where the depression angle D will always be near zero degrees the transformer 23 can of course be omitted in which event the output of transformer 24 will be connected to the input of potentiometer 32.

The sequence of potentiometers and transformers is obviously unimportant as long as the computer output voltage is proportional to the product of the various above mentioned parameters (i. e. where the approximation method of Fig. 4 is utilized). The depression angle transformer 23 could be replaced by a potentiometer which is wound so that it has a cosine function resistance distribution, but this is only practical where the depression angle will vary over only 180 degrees.

As is apparent to those skilled in the art, the sum of the resistance of variable resistance 34 and potentiometer 35 must be large enough relative to potentiometer 32 that it will have no appreciable effect on the net input impedance of potentiometer 32.

For the same reason the magnitude of the impedance load on the comparison circuit 12, must be substantially larger than the magnitude of the impedance of potentiometer 35.

Although it may not be apparent, the apparatus thus far disclosed will automatically correct for the Doppler effect whether the Doppler effect tends to increase the echo frequency (as when the ship 2 is approaching the assumed stationary submarine 3) or whether the Doppler effect tends to decrease the echo frequency (as when ship 2 is receding from submarine 3). Assuming that ship 2 is moving forward, then if the ship is receding from a submarine 3, shaft 5 of the propagating element 5 will have a bearing between +90° and —90° so that the polarity of the voltage output from transformer 24 and the computer output voltage (due to the inherent operation of a synchro type rotary transformer) will be 180 degrees out of phase with the condition when the bearing angle of the shaft 5 is from 90° to 270° (i. e., when ship 2 is approaching submarine 3). A change in polarity of the computer output voltage will, as will hereinafter be explained, change the direction in which the frequency of oscillator 18 is varied.

The comparison circuit 12 shown in Figure 5 is basically a circuit which compares the output voltage of the computer 11 (voltage across conductors 43—44) and the voltage between two terminals $m$—$n$ across which a potentiometer 17' is included. Whenever the voltage output of the computer is different from the voltage across terminals $m$—$n$, there will be a net voltage of one phase or another across points $p$—$q$. By means of the conventional balanced push-pull amplifier circuit formed by tubes 45—48 and their associated circuit elements, which are coupled across points $p$—$q$, a voltage difference appears across push pull output transformer 49 which voltage is fed to motor 13. Motor 13 turns condenser shaft 17, varying condenser 19 thereby and also moving arm 16 of potentiometer 17'. The movable arm of the potentiometer 17' is connected to terminal point $n$ so that the circuit is driven in the direction of balance whereupon the motor stops when the current flowing in primary windings 50—51 of transformer 49 is equal and opposite in direction so that no output voltage appears across the secondary of transformer 49 to which motor 13 is connected. The frequency of oscillator 18 is then properly adjusted to keep the desired echo frequency if resistance 34 has been properly adjusted.

To more clearly see how the circuit operates, assume that there is no Doppler error. The output voltage of the computer 11 (voltage across leads 43—44) will be zero. If the movable arm 16 of potentiometer 17' is connected to its mid-point, and resistors 39—40 (which are each joined at one end to terminal point $m$, and at the other end to the opposite terminals of potentiometer 17') are equal there will be no voltage across terminal points $m$—$n$, and thus there is no voltage applied to the balanced push pull amplifier circuit connected across points $p$—$q$. The motor 13 of course will not turn, and the frequency of oscillator 20 is then adjusted, if necessary, to give the proper value of received echo frequency.

Now assume that the propagating element 1 is suddenly caused to move toward an assumed stationary target. This will cause the echo frequency to suddenly increase say by a 1 kc. to 41 kc. The computer 11 will now have a net A. C. voltage amplitude of say 10 volts and thus since terminals $m$—$n$ are in series relation with the output of the computer 11, the voltage across the input to the balanced push-pull amplifier system (points $p$—$q$) will be the sum of the computer voltage and the voltage across points $m$—$n$ which is 10 volts. There will be a voltage coupled to motor 13 of one phase which will revolve motor 13 in a first given direction. (Motor 13 could be a two phase synchronous motor in which case the output of transformer 49 would supply one of the phases.) The connections from the output transformer 49 to motor 13 are made so that motor 13 varies condenser 19 in the correct direction. Likewise the mechanical coupling from the condenser shaft 17 to the arm 16 of potentiometer 17' is so made that the movable arm 16 will be moved in a direction which will tend to reduce the voltage across points $p$—$q$, the input to the push pull amplifier circuit. When this voltage is zero, the motor 13 will cease rotating and the change of capacity of condenser 19 $\Delta c$ and hence the change of the frequency of oscillator 18 $f_1$ (see Equation 7) will be proportional to the difference between the computer voltage (10 volts) and the voltage between terminals $m$—$n$ (which was zero at the start of the sequence of events).

Now, if the propagating element 1 were receding from an assumed stationary target at the same speed it was in the previous example approaching, the phase of the voltage output of the computer 11 will be reversed and the phase of the voltage applied to the motor is also reversed so that the frequency of oscillator 10 is varied in the opposite direction. This causes motor 13 and hence arm 16 of potentiometer 17' to move in the opposite direction until the voltage between $p$ and $q$ is again reduced to zero.

It should be noted that the balanced push pull amplifier circuit shown in Fig. 5 could be omitted entirely and the voltage across points $p$ and $q$ could conceivably be directly applied to motor 13. The use of a push pull amplifier circuit across points $p$ and $q$ is preferred because it increases the sensitivity of the system, and it shunts the computer with a high impedance which is important for reasons previously explained.

As was previously stated, the propagating element 1 is also a receiving element and it delivers an electrical voltage at the echo frequency to the receiver 59.

Although the specification has described the present invention in connection with an echo detecting apparatus, the same method and apparatus is applicable to a situation where the sound apparatus on the ship 2 is used to remotely control another vehicle such as submarine 3 where the Doppled due to the transmitting ship 2 is to be nullified so that the receiver circuit on the submarine can be narrowly tuned.

The error due to the Doppler effect in such a situation is given by a different equation than that indicated by Equation 2. A suitable computer could be used to provide a voltage proportional to the Doppler error and vary the tuning capacitor 19 in the manner just described.

The Doppler effect is a more troublesome problem for sound propagating systems than in electromagnetic propagating systems such as radio and radar apparatus because the Doppler frequencies are smaller relative to the propagated frequencies in electromagnetic systems than in sound systems. This is because the speed of an electromagnetic wave relative to the speed of an electromagnetic wave propagating element located on a ship or airplane etc. is much higher than the speed of a sound wave relative to the velocity of a sound wave propagating element located on a similar vehicle. However, the apparatus and method of the present invention could have useful application with electromagnetic propagating apparatus, and this is especially true when one realizes that the speeds now being obtained by airplanes and the like have reached impressive magnitudes.

It should also be noted, that although all of the explanation thus far has been focused on examples where the known Doppler effect was due to the propagating element motion in relation to an assumed stationary target, the method and apparatus of the present invention are also applicable to a situation where the Doppler effect due to the motion of a target is also to be nullified if the motion of the target relative to the propagating element is known. This is true, for example, in remote controlled apparatus such as the buzz-bomb and the like.

For purposes of laying a foundation for the terms used in the claims, the term "Doppler frequency shift" shall mean the apparent change in propagated frequency due to the known relative motion between the propagating element 1, and the target or object 3 against which the energy from said propagating element is to impinge. This apparent change in frequency will, as previously explained, be dependent on the application to which the apparatus is put. That is, where echo detecting apparatus is involved, the magnitude of the Doppler is different from what it would be where the receiving apparatus is to be located on the target as, for example, when submarine 3 is to be remotely controlled by ship 2. Also, the term "relative motion" in the case where the motion of the target is not known, refers to the relative motion between the moving propagating element and the target assuming the latter was stationary. Where on the other hand, the motion of the target is known also, the relative motion will be the actual relative motion between the target and the propagating element.

Many modifications can be made of the specific details of the apparatus herein disclosed without deviating from the scope of the present invention.

The invention described herein may be manufactured and used by or for the Government of the United States of America for governmental purposes without the payment of any royalties thereon or therefor.

What is claimed is:

1. In an echo ranging system including a transmitter and a receiver adapted to be moved relative to a given object thereby giving rise to a Doppler frequency shift in the received energy, an apparatus for cancelling the Doppler frequency shift in the received energy due to movement of the ranging system comprising first means providing a voltage representative of and proportionate to the original propagated frequency in said echo ranging system, second means providing a voltage representative of and proportionate to the direction in space of the reflecting surface from said transmitter, third means operable to provide a voltage representative of and proportionate to the velocity of the transmitter, voltage combining means connected to said first, second and third means providing a voltage representative of and proportionate to the product of said first, second and third means, frequency correcting means responsive to the output of said voltage combining means and adapted to compensate for the relative motion of said transmitter with respect to said given object.

2. In an echo ranging system including a transmitter and a receiver adapted to be moved relative to a given object, an apparatus for nullifying the Doppler frequency shift in the received signal due to the motion of the ranging system, comprising first means operable to produce a voltage representative of and proportionate to the original propagated frequency in said echo ranging system, second means operable to produce a voltage representative of and proportionate to the angle in space of the reflecting surface from said transmitter, third means operable to produce a voltage representative of and proportionate to the velocity of the transmitter, voltage combining means connected to said first, second and third means providing a voltage representative of and proportionate to the product of said first, second and third means, and frequency correcting means responsive to the output of said voltage combining means to correct the frequency of the transmitter of said echo ranging system to compensate for the Doppler shift in the received signal due to the motion of the echo ranging system.

3. In an echo ranging system including a transmitter and a receiver adapted to be moved relative to a given object, an apparatus for nullifying the Doppler frequency shift in the received signal due to the motion of the ranging system comprising first means operable to produce a voltage representative of and proportionate to the original propagated frequency in said echo ranging system, second means operable to produce a voltage representative of and proportionate to the cosine of the acute angle defined by the vertical and a straight line interconnecting said transmitter and said given object, third means operable to produce a voltage representative of and proportionate to the cosine of the acute angle defined by the horizontal and said straight line, fourth means operable to produce a voltage representative of and proportionate to the velocity of the transmitter, voltage combining means connected to said first, second, third and fourth means providing a voltage representative of and proportionate to the product of said first, second, third and fourth means, and frequency correcting means responsive to the output of said voltage combining means and adapted to compensate for the relative motion of said transmitter with respect to said given object.

4. In an echo ranging system including a transmitter and a receiver adapted to be moved relative to a given object, an apparatus for nullifying the Doppler frequency shift in the received signal due to the motion of the ranging system comprising first means operable to produce a voltage representative of and proportionate to the original propagated frequency in said echo ranging system, second means operable to produce a voltage representative of and proportionate to the cosine of the acute angle defined by the vertical and a straight line interconnecting said transmitter and said given object, third means operable to produce a voltage representative of and proportionate to the cosine of the acute angle defined by the horizontal and said straight line, fourth means operable to produce a voltage representative of and proportionate to the velocity of the transmitter, voltage combining means connected to said first, second, third and fourth means providing a voltage representative of and proportionate to the product of said first, second, third and fourth means, and frequency correcting means responsive to the output of said voltage combining means to correct the frequency of the transmitter of said echo ranging system to compensate for the Doppler shift in the received signal due to the motion of the echo ranging system.

References Cited in the file of this patent

UNITED STATES PATENTS

| | | |
|---|---|---|
| 1,737,147 | Chireix | Nov. 26, 1929 |
| 2,303,444 | Evans | Dec. 1, 1942 |
| 2,418,538 | Yetter | Apr. 8, 1947 |
| 2,431,854 | Wood | Dec. 2, 1947 |
| 2,541,066 | Jaynes | Feb. 13, 1951 |
| 2,546,973 | Chatterjea et al. | Apr. 3, 1951 |
| 2,621,243 | Sunstein | Dec. 9, 1952 |